United States Patent [19]
Hirasawa

[11] Patent Number: 6,130,716
[45] Date of Patent: Oct. 10, 2000

[54] AUTOFOCUSING CAMERA DEVICE

[75] Inventor: Masahide Hirasawa, Sagamihara, Japan

[73] Assignee: Canon Kabushiki Kaisha, Tokyo, Japan

[21] Appl. No.: 08/333,876

[22] Filed: Nov. 3, 1994

Related U.S. Application Data

[63] Continuation of application No. 07/922,177, Jul. 30, 1992, abandoned.

[30] Foreign Application Priority Data

| Aug. 9, 1991 | [JP] | Japan | 3-225129 |
| Aug. 9, 1991 | [JP] | Japan | 3-225130 |
| Aug. 9, 1991 | [JP] | Japan | 3-225131 |
| Aug. 9, 1991 | [JP] | Japan | 3-225132 |
| Aug. 9, 1991 | [JP] | Japan | 3-225136 |

[51] Int. Cl.$^7$ ................................................. H04N 5/232
[52] U.S. Cl. .......................... 348/347; 348/355; 396/121
[58] Field of Search ..................................... 348/345, 348, 348/349, 353, 354, 355, 356; 354/400, 402; 364/554, 575; 396/89, 121, 122, 123, 125; H04N 5/232

[56] References Cited

U.S. PATENT DOCUMENTS

| 4,638,364 | 1/1987 | Hiramatsu | 358/227 |
| 4,762,986 | 8/1988 | Suda et al. | 250/201 |
| 4,812,636 | 3/1989 | Kusaka et al. | 250/201.7 |
| 4,903,135 | 2/1990 | Ohtake et al. | 348/345 |
| 4,967,279 | 10/1990 | Murashima | 358/227 |
| 4,975,726 | 12/1990 | Kuga et al. | 354/402 |
| 5,003,339 | 3/1991 | Kikuchi et al. | 396/100 |
| 5,060,001 | 10/1991 | Kaneda | 354/400 |
| 5,164,756 | 11/1992 | Hirasawa | 354/400 |
| 5,200,828 | 4/1993 | Jang et al. | 358/227 |
| 5,212,513 | 5/1993 | Ishida et al. | 354/402 |
| 5,212,516 | 5/1993 | Yamada et al. | 354/402 |
| 5,249,058 | 9/1993 | Murata et al. | 348/354 |

FOREIGN PATENT DOCUMENTS

| 63-151180 | 6/1988 | Japan | H04N 5/232 |
| 88-151180 | 6/1988 | Japan | H04N 5/232 |

*Primary Examiner*—Wendy Garber
*Assistant Examiner*—Ngoc-Yen Vu
*Attorney, Agent, or Firm*—Robin, Blecker & Daley

[57] ABSTRACT

A camera of the type having a lens drive motor for moving a focus lens, an image pick-up device for converting an optical image passed through the optical system including the focus lens into an image signal, a sampling circuit for sampling the high frequency component value of the image signal, and a control circuit for controlling the lens drive motor so as to maximize the high frequency component value. The camera has a high frequency component value memory for storing a history of the high frequency component value sampled by the sampling circuit. The control circuit controls the lens drive motor so as to maximize the high frequency component value after the focus adjustment, in accordance with the stored history of the high frequency component value.

23 Claims, 13 Drawing Sheets

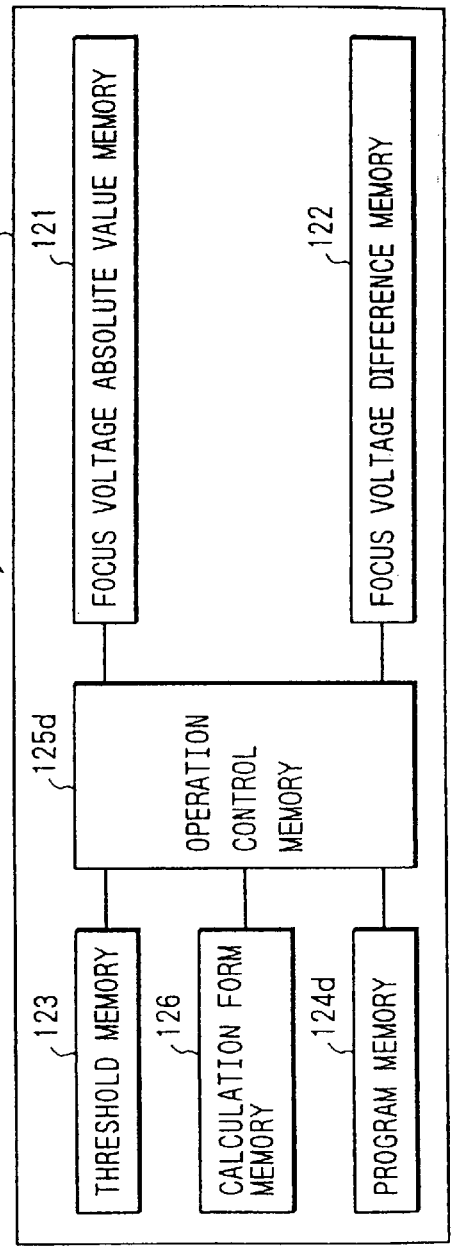

AUTOFOCUSING CAMERA DEVICE

This is a continuation application under 37 CFR 1.62 of prior application Ser. No. 07/922,177 which was filed on Jul. 30, 1992 (aban.)

BACKGROUND OF THE INVENTION

1. Field of the Invention

The present invention relates to a camera which performs automatic focusing by using image signal information whose contents change with whether the image is in-focus or out-of-focus.

2. Related Background Art

The development in the field of cameras has progressed remarkably in recent years. The improvement on the quality of cameras takes an important role, as for example, an automatic focusing device is mounted on each camera as a standard device.

In a VTR built-in type camera having a television camera and a video tape recorder, optical signals passed through the optical system including lenses of the camera unit are converted into electrical signals by image pick-up elements and recorded by the tape recorder. It is a general tendency that the electrical signals are also used in automatic focusing (hereinafter called "AF" where applicable), to use mechanical and electrical components in common and reduce the volume and weight of the camera.

FIG. 1 shows an optical system of a VTR built-in type camera. Reference numeral 101 represents a first lens group for focusing (hereinafter called "focus lens" where applicable). Reference numeral 102 represents a second lens group for variable magnification (hereinafter called "zoom lens" where applicable). Reference numeral 103 represents a third lens group for adjusting the focal plane which changes with a movement of the zoom lens 102. Reference numeral 104 represents an aperture, and reference numeral 105 represents a fourth lens group for correctly focusing an optical image on an image pick-up surface of an image pick-up device 106. The optical image information received at the image pick-up surface 106a of the image pick-up device 106 is converted into electrical image signals. The first lens group 101 moves in parallel with an optical axis L to focus an image of a subject on the image pick-up surface 106a. It is generally known that the image signal outputted from the image pick-up device 106 has higher frequency components, the more the optical system is set near the in-focus state of the subject. The high frequency component of the image signal can be transformed to a focus voltage FV. The characteristic of a focus voltage FV is shown in FIG. 2.

In FIG. 2, reference numeral 201 represents a curve of the focus voltage FV. Reference numerals 202 and 203 represent arrows indicating a change of the focus voltage while the first lens group 101 reaches an in-focus state from an out-of-focus state. The focus voltage FV becomes maximum at the focusing point Pf, and lowers at other points. At a much blurry point (the remotest point Po from the focusing point Pf), the focus voltage FV becomes minimum and scarcely changes with a movement of the first lens group 101.

The manner how the focus voltage is changed (as indicated by arrows 202 and 203) will be described with reference to the flow chart shown in FIG. 3. This flow chart illustrates a so-called mount climbing AF control method. In the following description, it is assumed that the lens groups 101 to 103 and 105 are controlled by a microcomputer and the like and that the control starts from the out-of-focus state of the focus lens 101.

Referring to FIG. 3, a control program starts at step S101. At step S102 the focus lens 101 is moved in an optional direction. At step S103 it is checked whether the focus voltage FV lowers as the focus lens 101 moves. At step S104 an actuator is moved in the opposite direction, the actuator driving the focus lens 101. Determined at step S105 is the direction of moving the focus lens 101 toward the focusing point. At step S106 the focus lens 101 is moved in the direction determined at step S105. At step S107 it is checked whether the focus voltage rises. At step S108 it is checked whether the focus voltage FV lowers. At step S109 the direction of the actuator driving the focus lens 101 is reversed. At step S110 it is checked whether a change in the focus voltage FV becomes small or ceases. At step S111 it is judged that the focus lens 101 has reached the focusing point, and so the focus lens 101 is stopped. At step S112 the control program terminates.

When the program shown in the flow chart of FIG. 3 starts (S101), the focus lens 101 moves in an optional direction (S102). If it is judged at step S103 that the focus voltage FV lowers (Yes judgment), it means that the focus lens 101 moves in the direction away from the focusing point Pf. Therefore, the focus lens 101 is moved in the opposite direction (S104), and the focus voltage FV is again checked (S103). If it is judged at step S103 that the focus voltage FV does not lower (No judgment), this direction is determined as the direction of the focus lens 101 toward the focusing point Pf (step S105) to then move the focus lens 101 in the determined direction.

While the focus lens 101 moves, it is checked if the focus voltage FV rises (S107). This state is indicated by the arrow 202 shown in FIG. 2.

Assuming that the focus lens 101 has passed the focusing point Pf, the focus voltage FV once reaches the flat top portion of the curve 201 and it will be judged at step S107 that the focus voltage FV does not rise (No judgment). As the focus lens 101 continues to move, the focus voltage starts lowering as indicated by the arrow 203 of FIG. 2. This lowering is checked (S108), and if it is confirmed (Yes judgment), the direction of the actuator driving the focus lens 101 is reversed (S109). When the focus lens 101 again reaches the flat top of the curve 201, it is checked at step S110 whether a change in the focus voltage FV becomes small or ceases. If confirmed (Yes judgment), this point is judged as the focusing point Pf, and the focus lens 101 is stopped (S111).

The method described with FIG. 3 is a fundamental AF method using image signals.

With the above-described method, the discrimination between in-focus and out-of-focus states and the determination of the direction toward the focusing point are made basing upon only a difference between the previous one focus voltage FV and the present one focus voltage FV. This method using such a small amount of information has the following disadvantages.

(1) There is a high possibility of errors of the discrimination between in-focus and out-of-focus states and the determination of the direction toward the focusing point.

(2) It is necessary to use an additional program for solving the disadvantage (1), and hence the control becomes complicated.

(3) The control becomes hard to be converged once a false judgment is made.

(4) It is difficult to estimate the operation of the AF control, resulting in an uncertainty of the control.

(5) It is difficult to deal with factors disturbing the control system, such as noises superimposed upon image signals, an abrupt change in position of a subject to be focused.

(6) The focus voltage FV changes greatly before it takes the in-focus state. However, the focus voltage FV will not change both in the in-focus state and much blurry state. Therefore, it is impossible to discriminate between the in-focus and much blurry states even if a plurality of past changes of the focus voltage FV are monitored and the tendency of their changes can be grasped.

(7) If the focus voltage changes abruptly because a subject quickly moves in, or out of, the range finding frame (in-focus detecting area), a false judgment is likely to occur that an in-focus state has passed during the AF control routine.

(8) If the focus voltage fluctuates because of noises on electrical circuits, it becomes somewhat difficult to discriminate between in-focus and out-of-focus states during the AF control routine.

(9) During the evaluation of the in-focus state by using the absolute values of the focus voltages, an abrupt change in the absolute value to be caused by noises superimposed on image signals, and a subject moving in, or out of, the range finding frame, may disturb the control system thus providing a possible false AF control operation.

SUMMARY OF THE INVENTION

The present invention has been made under the above-described circumstances. It is a first object of the present invention to provide a camera capable of automatically focusing correctly and easily.

It is a second object of the present invention to provide a camera capable of discriminating between in-focus and out-of-focus states and determining the direction of driving a lens in a stable and correct manner, even if the focus signal changes abruptly or has noises.

It is a third object of the present invention to provide a camera capable of always estimating a focusing point with high precision irrespective of the photographing conditions.

In order to achieve the above objects, according to a preferred embodiment of the present invention, there is disclosed a camera device comprising: lens transporting means for moving a focus lens; photoelectric converting means for converting an optical image having passed through an optical system inclusive of the focus lens, into an image signal; sampling means for sampling the high frequency component value of the image signal; storing means for storing a history of the high frequency component value sampled by the sampling means; and controlling means for controlling the lens transporting means so as to maximize the high frequency component value, in accordance with the history of the high frequency component value stored in the storing means.

It is a fourth object of the present invention to provide a camera capable of continuing to perform a focus control operation without an erroneous operation, even if the level of the focus voltage changes because of a change in environmental brightness.

It is a fifth object of the present invention to provide a camera capable of correctly discriminating between an in-focus state and a much blurry state.

In order to achieve the above objects, according to a preferred embodiment, there is disclosed a camera device comprising: lens transporting means for moving a focus lens; photoelectric converting means for converting an optical image having passed through an optical system inclusive of the focus lens, into an image signal; sampling means for sampling the high frequency component value of the image signal; storing means for storing a history of the high frequency component value sampled by the sampling means; and controlling means for detecting a change state of the high frequency component values stored in the storing means and controlling the focal position of the focus lens, in accordance with whether the absolute value of the high frequency component value is larger than a predetermined value if the change amount of the stored high frequency component value is zero or very small.

According to another preferred embodiment of the present invention, there is disclosed a camera device comprising: lens transporting means for moving a focus lens; photoelectric converting means for converting an optical image having passed through an optical system inclusive of the focus lens, into an image signal; sampling means for sampling a focus signal at a predetermined sampling period; storing means for storing a history of the focus signal sampled by the sampling means; change state detecting means for detecting a change state of the focus signal by using the stored value; and controlling means for controlling the lens transporting means by a first method in accordance with the history of the focus signal stored in the storing means while the detected change state is stable, and by a second method difference from the first method while the detected change state is unstable.

It is another object of the present invention to provide a camera capable of correctly and automatically focusing even if a subject moves abruptly, in accordance with a history of sampled focus signal values and a change state of focus signals.

The other objects and advantages of the present invention will become apparent from the following detailed description when read in connection with the accompanying drawings.

BRIEF DESCRIPTION OF THE DRAWINGS

FIG. 11 is a diagram for explaining the focus control algorithm for the camera of the third embodiment of the present invention.

FIG. 12 is a schematic diagram showing the structure of a system controller for a camera according to a fourth embodiment of the present invention.

DESCRIPTION OF THE PREFERRED EMBODIMENTS

Preferred embodiments of the present invention will be described with reference to the accompanying drawings.

Figure 1:
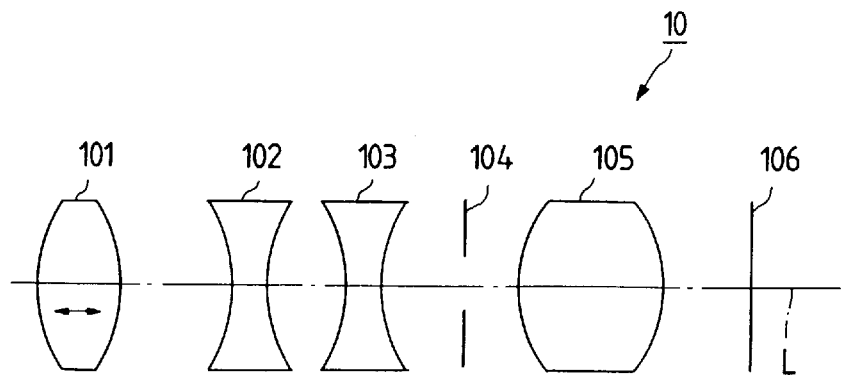
FIG. 1 is a diagram showing the optical system of a conventional camera.
Figure 4:
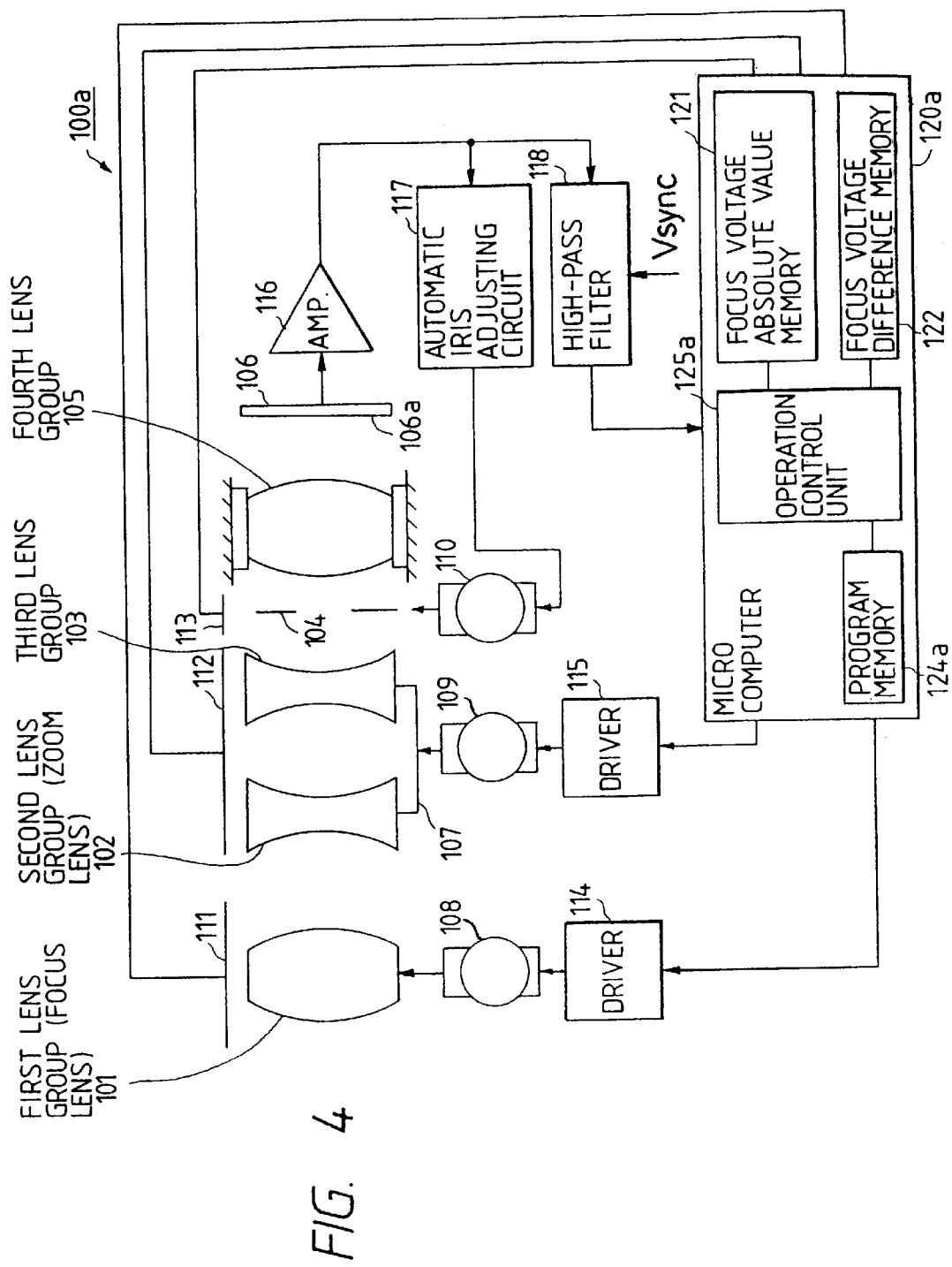
FIG. 4 is a block diagram showing a first embodiment of a camera according to the present invention.

FIG. 4 shows the structure of the main part of a camera 100a according to the first embodiment of the present invention. The camera 100a has: a focus lens 101 like a lens of the conventional camera 10 shown in FIG. 1; a zoom lens 102; a third lens group 103; an aperture 104; a fourth lens group 105; an image pick-up surface 106 of conversion means; a cam ring 107 for moving the zoom lens 102 and third lens group 103 in unison; actuators 108, 109 and 110 as lens moving means for moving the focus lens 101, cam ring 107 and aperture 104; position encoders 111, 112 and 113 for detecting the movement amounts of the focus lens 101, cam ring 107 and aperture 104 and converting the movement amounts into electrical signals which are supplied to a system controller 120a to be later described; drivers 114 and 115 for driving the actuators 108 and 109; an amplifier 116 for amplifying an image signal from an image pick-up device 106; a known automatic aperture control circuit 117; a high-pass filter 118 as sampling means for deriving only the high frequency components changing with a focusing state, out of the image signal outputted from the image pick-up device 106 via the amplifier 116 and for supplying the high frequency components to the system controller 120a which controls every part of the camera 100a, and other components.

The automatic iris adjusting circuit 117 causes the actuator 110 to automatically open and close the aperture 104, in accordance with the level of a signal outputted via the amplifier 116 from the image pick-up device 106, to thereby maintain constant the brightness level of an image signal outputted from the image pick-up device.

The system controller 120a is constructed of a microcomputer having a focus voltage absolute value memory 121, a focus voltage difference memory 122, a program memory 124a, and an operation control unit 125a. The focus voltage absolute value memory 121 and focus voltage difference memory 122 are constructed of a RAM for example.

Figure 5:
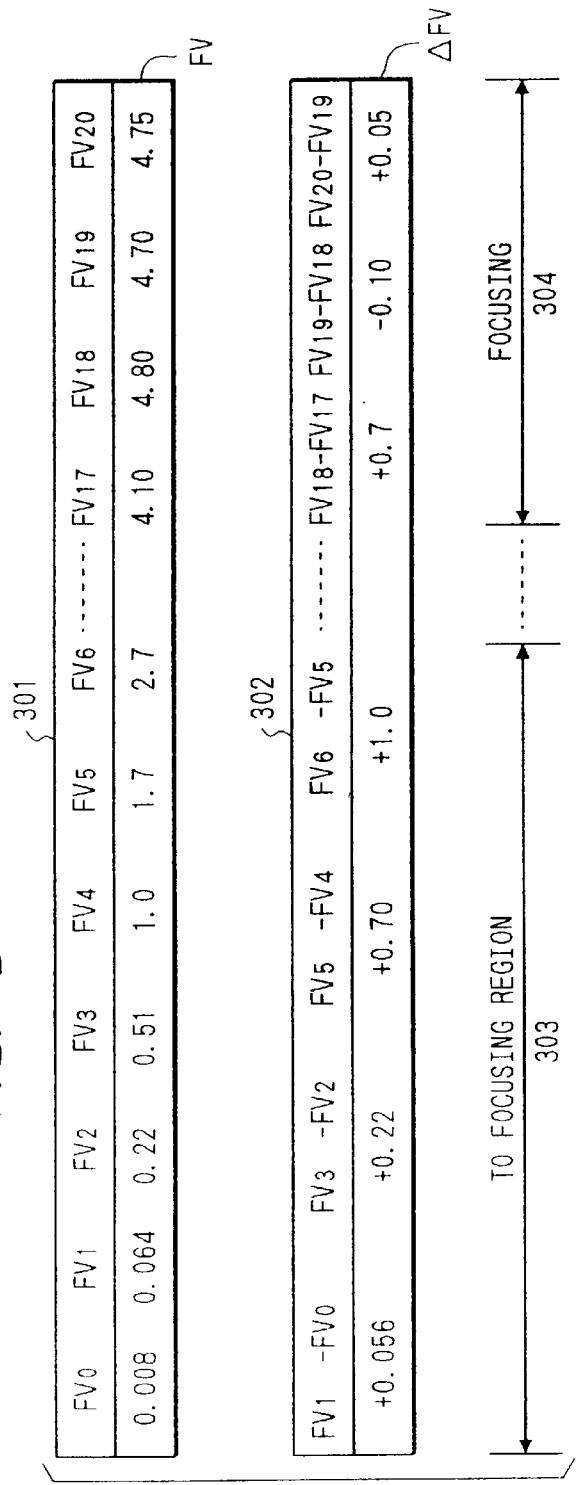
FIG. 5 is a memory map of focus voltages for explaining the operation of the present invention.

As shown in FIG. 5, the focus voltage absolute value memory 121 stores the absolute values $FV_0$ to $FV_{20}$ of focus voltages obtained during past twenty vertical synchronizing periods (twenty Vsync). Namely, when the system controller 120a receives the absolute value $FV_0$ of a focus voltage from the high-pass filter 118, the signal representative of the absolute value $FV_0$ is A/D converted within the controller 120a under control of the operation control unit 125a. This operation is repeated by shifting the address of the focus voltage absolute value memory 121 one by one in synchronism with the vertical synchronizing signal to store the latest data. In this manner, twenty focus voltages $FV_0$ to $FV_{20}$ are stored in the memory synchronously with Vsync. Reference numeral 303 in FIG. 5 represents a region in which the focus lens 101 moves toward a focusing region under the AF control by the system controller 120a, and in which the focus voltage rises. Reference numeral 304 represents a region in which the focusing lens 101 takes an in-focus state, and in which the focus voltage changes less within a small level range.

As also shown in FIG. 5, the focus voltage difference memory 122 stores voltage difference data ΔFV. The operation control unit 125a calculates a difference between two adjacent absolute values among twenty focus voltages $FV_0$ to $FV_{20}$ data 301 stored in the focus voltage absolute value memory 121 to obtain each ΔFV with a positive or negative sign added to it. In this case, as shown in the lower diagram shown in FIG. 5, within the region 303 the focus lens group 101 moves toward the focusing region under the AF control because a difference between two adjacent focus voltage absolute values $FV_0$ to $FV_{20}$ during vertical synchronizing periods rises, and within the region 304 it takes the in-focus state because the difference between two focus voltage absolute values $FV_0$ to $FV_{20}$ increases or decreases less. Within the region 304, the difference $(FV_{19}-FV_{18})$ takes a negative value when the focus lens group 101 passes the focusing point, and the difference $(FV_{20}-FV_{19})$ takes a positive value when the focus lens group 101 moves toward the focusing point. The focusing region 304 changes depending upon the focusing sensitivity and subject. Wherever the focus lens group 101 locates within the region 304, it is regarded as an in-focus state. A plurality of focus voltage differences during vertical synchronizing periods are stored so that the present focus state can be estimated from the stored history.

Figure 3:
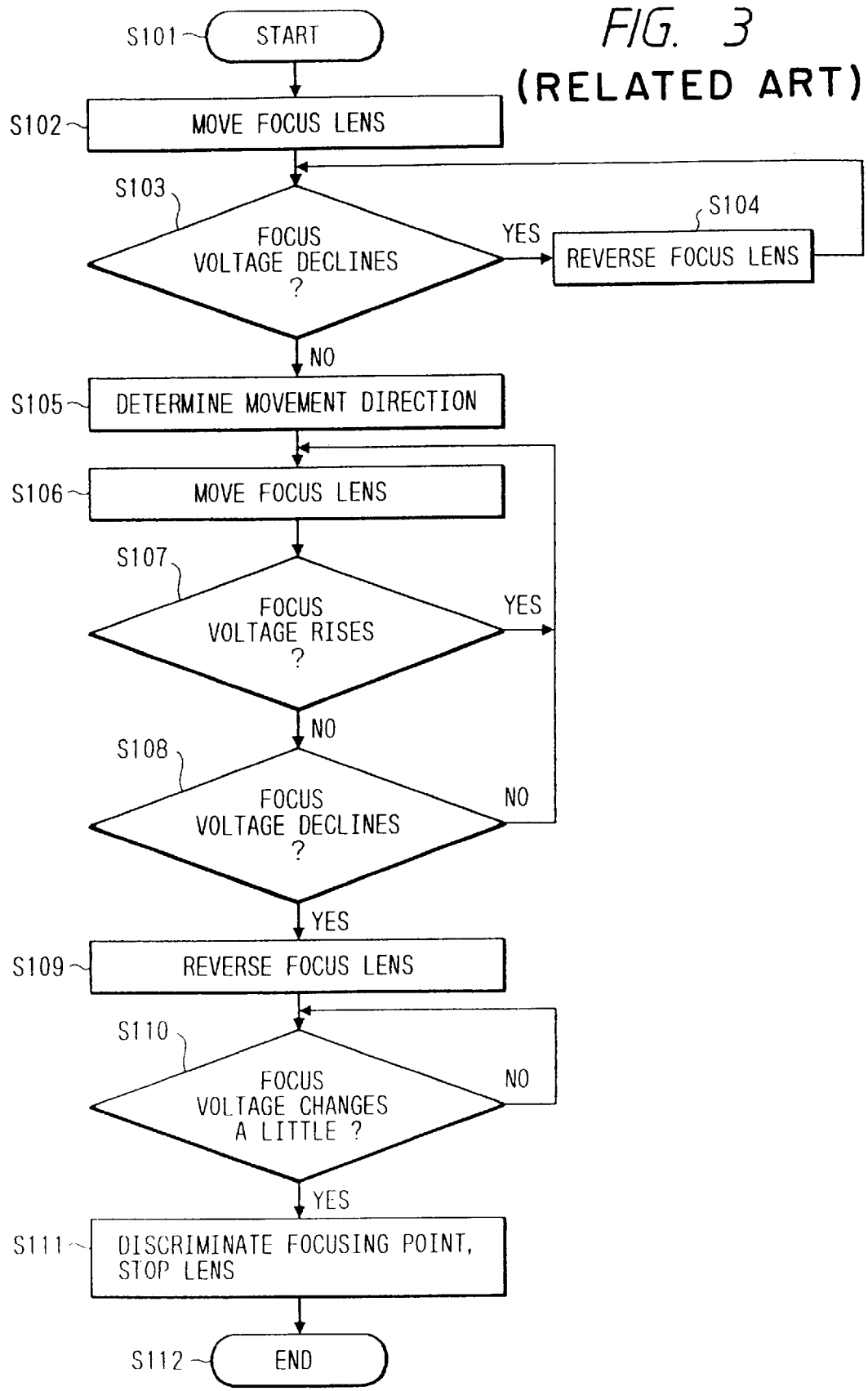
FIG. 3 is a flow chart showing the fundamental algorithm of automatic focussing for cameras.

The program memory 124a stores the program for executing steps S101 to S105 shown in FIG. 3, and other data.

Figure 6:
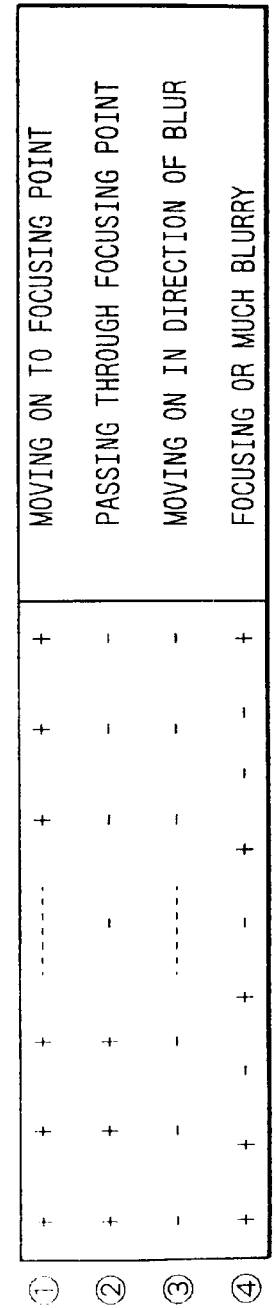
FIG. 6 is a diagram for explaining an in-focus state discriminating algorithm according to the present invention.

The system controller 120a checks the depth of field and the focusing sensitivity in accordance with the position information supplied from the position encoders 111, 112 and 113, to execute an AF control suitable for the photographing condition, e.g., by controlling the drive speed of the focus lens 101. The system controller 120a then discriminates between the in-focus state and out-of-focus state, by using the data stored in the focus voltage absolute value memory 121 and focus voltage difference memory 122. In the case of the out-of-focus state, the system controller 120a supplies a drive command via the driver 114 to the actuator 108 to move the focus lens 101 for the purpose of the AF control. As shown in FIG. 6, the operation control unit 125 of the system controller 120a discriminates between the in-focus state and out-of-focus state, from the positive/negative difference patterns (1) to (4) of voltage differences ΔFV data 302, and also judges whether the focus state in near the in-focus state, basing upon the change state of voltage differences ΔFV data 302 stored in the focus voltage difference memory 122. If most of the focus voltage differences ΔFV takes a positive value such as of the pattern (1), the operation control unit 125a judges that the focus lens 101 is presently in the region 303 moving to the focusing point. If the values ΔFV increase in the order of +0.056, +0.22, and +0.70 as shown in FIG. 5, the focus state is judged as near the in-focus state. If the focus voltage differences ΔFV changes from positive values to negative values such as of the pattern (2), it is judged that the focusing point Pf is present near at the point at which the positive value transits to the negative value, and that presently the focus lens 101 has passed it. If most of the focus voltage differences ΔFV takes a negative value such as of the pattern (3), it is judged that the focus lens 101 moves in the direction opposite to the focusing direction. If the positive and negative values of the focus voltage difference values ΔFV are not continuous but irregular such as of the pattern (4), it is judged that the focus state is an in-focus state or a much blurry state to the extent that the focus voltage difference ΔFV hardly exists (the much blurry state corresponding to that the focus lens 101 is positioned at the skirt of the curve 201 shown in FIG. 2).

The system controller 120*a* executes a variable magnification operation upon actuation of a zoom switch (not shown). Specifically, upon selection of a start/stop/ magnification by the zoom switch, the system controller 120*a* supplies this selected operation command to the actuator 109 via the driver 115. The variable magnification operation is executed by the rotation of the cam ring 107 and the corresponding movement of the second and third lens groups 102 and 103.

Next, the AF control by the system controller 120*a* of the first embodiment camera 100*a* constructed as above will be described with reference to the flow chart shown in FIG. 3.

As described with steps S102 to S105 shown in FIG. 3, the operation control unit 125*a* first reads from the program memory 124*a* the program corresponding to steps S102 to S105 for the preparation of executing it (S101). The operation control unit 125*a* sends a control signal to the actuator 108 via the driver 114 to move the focus lens 101 in the optional direction. The operation control unit 125*a* stores a focus voltage FV in the focus voltage absolute value memory 121 synchronously with Vsync and stores a difference for each FV in the focus voltage difference memory 122. It is then checked if the focus voltage FV lowers (S103). The direction of driving the focus lens 101 is determined (S105). As the focus lens 101 continues to move in the determined direction, the focus voltage FV gradually rises. This state corresponds to the data 301 for the region 303 shown in FIG. 5. The focus voltage difference ΔFV for the data 302 takes a positive value in the region 303. As the focus lens 101 further continues to move in the same direction, the subject image projected on the image pick-up surface 106*a* enters the focusing region 304. This focusing region 304 of the focus lens 101 changes depending upon the focusing sensitivity and the depth of field. Wherever the focus lens 101 is positioned within this region 304, it is regarded as the in-focus state. Within the focusing region 304, the focus voltage absolute value FV data 301 changes less and the absolute value of the difference ΔFV data 302 becomes small, taking the pattern (4) of FIG. 6 having uniformly mixed positive and negative signs. As seen from FIG. 5, within the region between the regions 303 and region 304, the increasing rate of the focus voltage FV reduces so that the absolute value of the focus voltage difference ΔFV becomes gradually small.

With the camera 100*a* of the first embodiment constructed as above, the drive direction, in-focus state and out-of-focus state of the focus lens 101 are judged from the positive/ negative patterns (1) to (4) of the focus voltage differences ΔFV data 302, thereby providing a correct AF control.

Furthermore, a relatively large amount of information, namely a plurality of past focus voltage absolute values $FV_0$ and differences ΔFV are stored and monitored. Therefore, the state of the focus voltages FV can be easily estimated with less errors. Even if the estimation is made incorrectly, the AF control can be adjusted by using past information, thereby providing an easier control than a conventional control.

Figure 7:
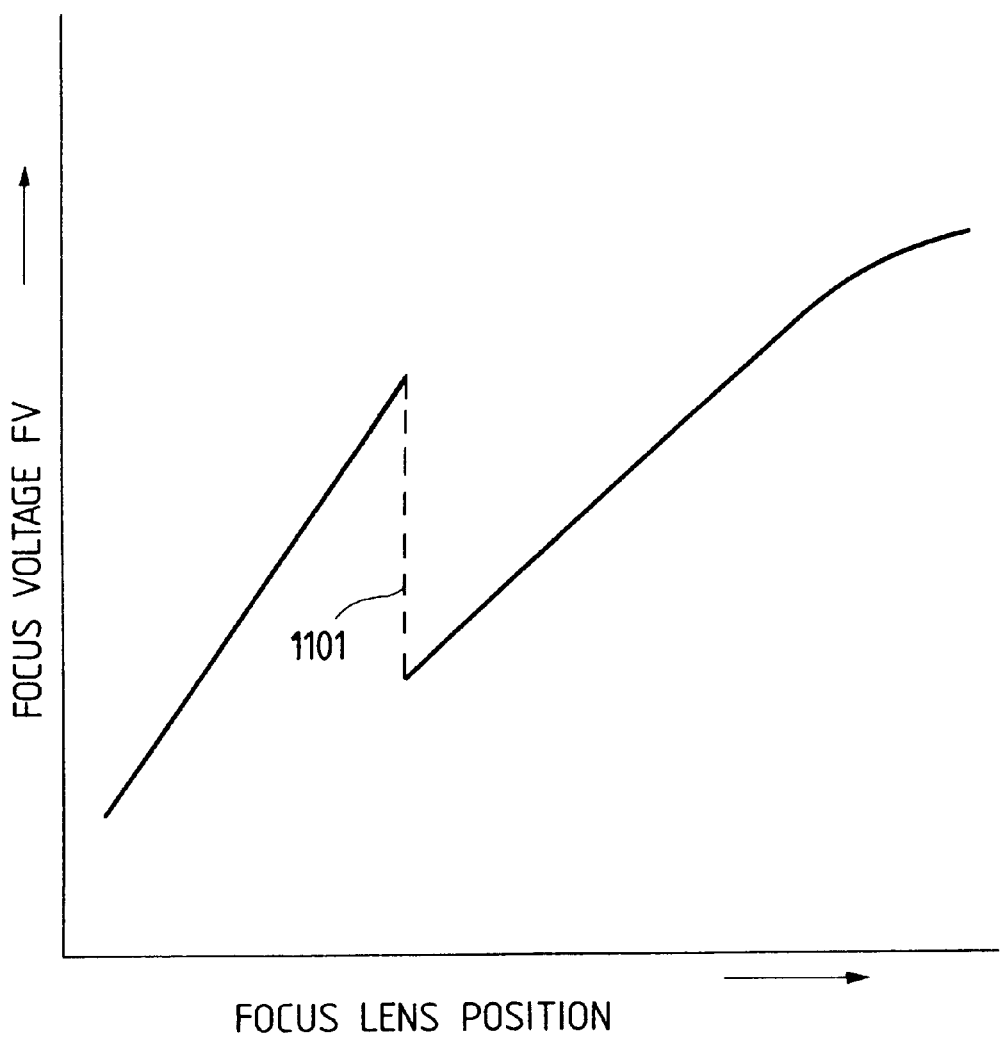
FIG. 7 is a graph showing a steep fall of the focus voltage.

Still further, with the assumption as shown in FIG. 3, future events can be easily estimated. In addition, focus voltage absolute values FV are not directly used for the AF control. Therefore, even if the focus voltage FV lowers abruptly as shown in FIG. 7 because the subject moves out of the range finding frame, such an abrupt fall can be neglected only to follow the slope of a rise of the focus voltages FV, thereby making free of a conventional malfunction. With such a control, even the focus voltage differences ΔFV take the pattern (4) of FIG. 6, it is possible to discriminate between the in-focus and much blurry states, by using a small program.

Figure 8:
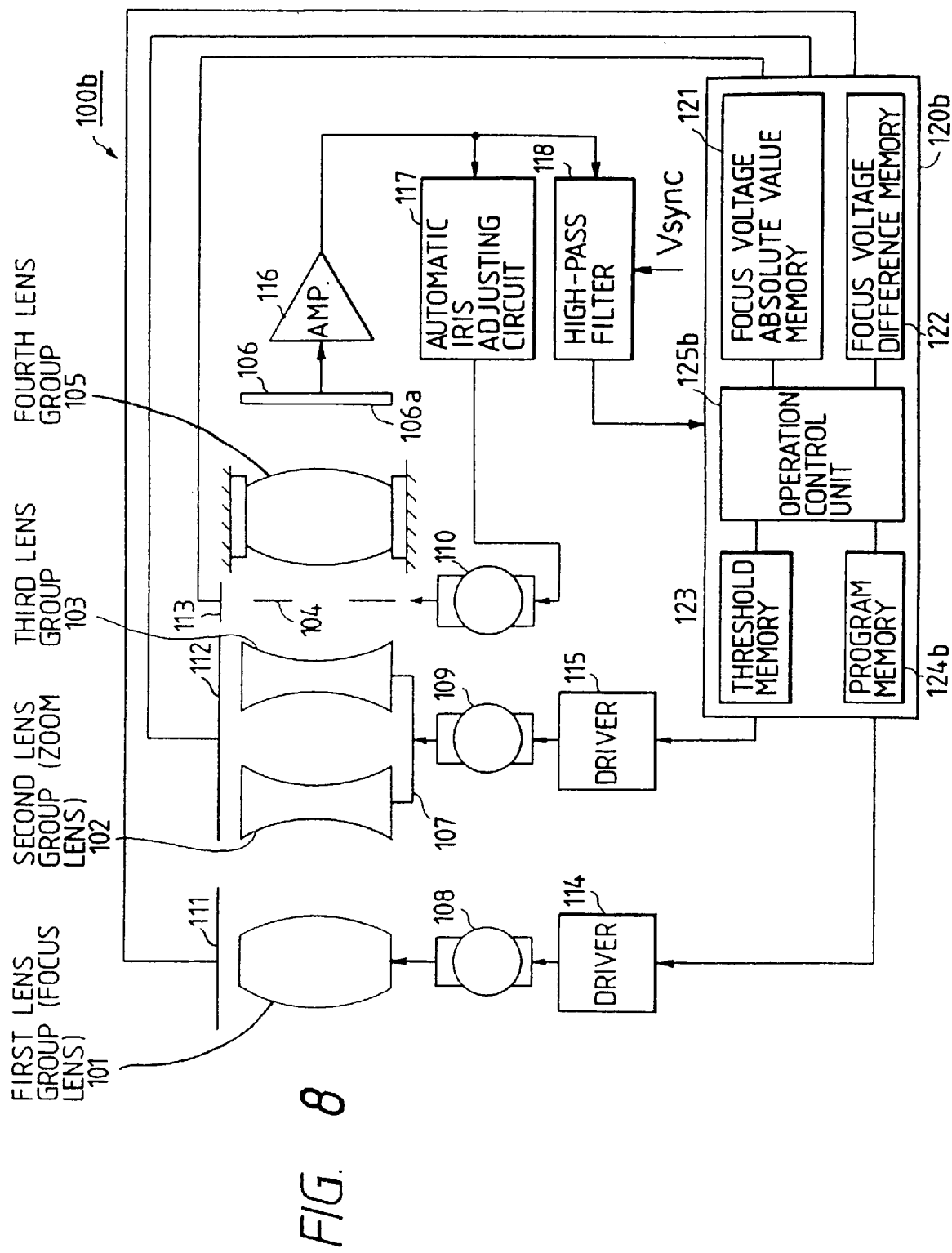
FIG. 8 is a block diagram showing a second embodiment of a camera according to the present invention.

FIG. 8 shows the outline structure of a system controller 120*b* of a camera 100*b* according to the second embodiment of the present invention. The camera 100*b* of the second embodiment has the same structure as the camera 100*a* of the first embodiment shown in FIG. 4, except the system controller 120*b*. The system controller 120*b* shown in FIG. 8 has a focus voltage absolute value memory 121 and focus voltage difference memory 122 like those of the first embodiment camera 100*a*, and a threshold value memory 123, program memory 124*b* and operation control unit 125*b*.

Figure 2:
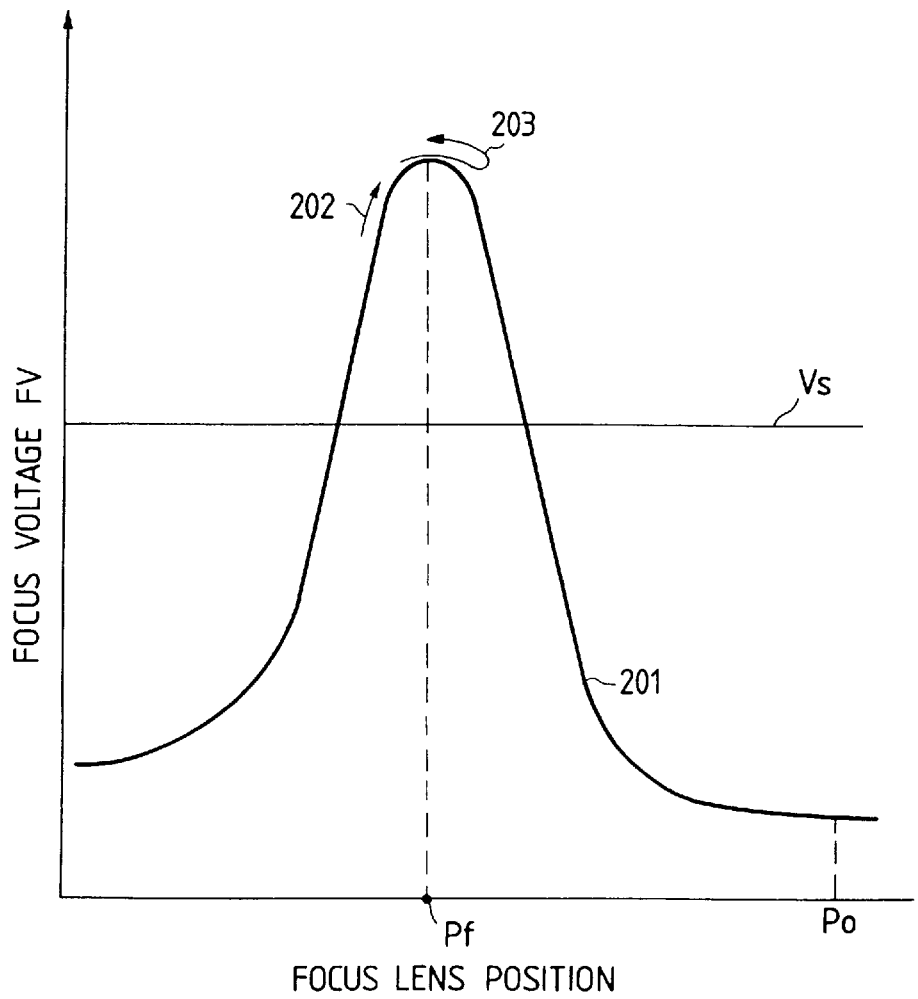
FIG. 2 is a graph showing the characteristics of the relation between a lens position and a focus voltage.

The newly added threshold value memory 123 stores a threshold value Vs of the focus voltage FV such as shown in FIG. 2.

Figure 9:
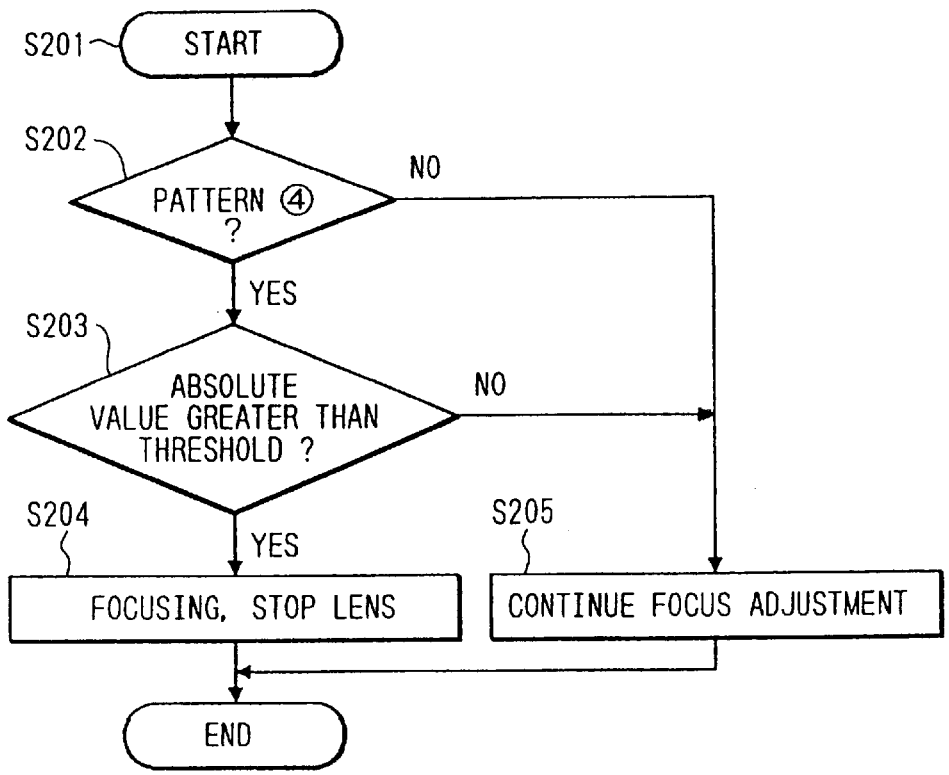
FIG. 9 is a flow chart for explaining the operation of the second embodiment shown in FIG. 8 according to the present invention.

The program memory 124*b* stores the program for executing steps S101 to S105 shown in FIG. 3, a program for executing the contents of the flow chart shown in FIG. 9 to be described later, and other data.

The system controller 120*b* operates in substantially the same manner as the controller 120*a* of the first embodiment camera 100*a*. However, for the pattern (4) of FIG. 6, the operation control unit 125*a* compares the focus voltage absolute value FV with the threshold value Vs to discriminate between the apex (in-focus) and skirt (much blurry) of the curve shown in FIG. 2.

The AF control by the system controller 120*b* of the second embodiment camera 100*b* constructed as above will be described with reference to the flow chart shown in FIG. 9.

The AF control for the pattern (4) shown in FIG. 6 will be described, the other AF control being carried out in the same manner as for the first embodiment camera 100*a*. The operation control unit 125*b* reads the program illustrated in the flow chart of FIG. 9 from the program memory 124*b*, and prepares for the execution thereof (S201). The operation control unit 125*b* of the system controller 120*a* judges whether the present focus state stands for the pattern (4) of FIG. 6 (S202). If not (No judgment), the control continues unchanged (S205). If it is judged at step S202 as the case of the pattern (4) (Yes judgment), it is checked whether the present focus voltage absolute value FV is larger than the threshold value Vs previously stored in the threshold value memory 123 (S203). The pattern (4) occurs at one of the apex (in-focus) and skirt (much blurry) of the curve shown in FIG. 2. It is therefore easy to discriminate between two states through comparison with the threshold value Vs. If the operation control unit 125*b* judges that the focus voltage absolute value FV inputted at step S203 is larger than the threshold value Vs (Yes judgment), it is regarded as an in-focus state and the focus lens 101 is stopped (S204). If it is judged at step S203 that the absolute value FV is smaller than the threshold value Vs (No judgment), the AF control continues unchanged (S205).

With the camera 100b of the second embodiment constructed as above, the following advantageous effects in addition to the effects given by the first embodiment camera 100a are obtained. Namely, it is possible to discriminate between the in-focus state and much blurry state even if the contents of the focus voltage difference ΔFV data 302 indicate the pattern (4) shown in FIG. 6, without incorrect judgment of the focus state. Such discrimination therefore requires only a small program, simplifying the overall control.

Furthermore, a relatively large amount of information, namely a plurality of past focus voltage absolute values $FV_0$ and differences ΔFV are stored and monitored. Therefore, the state of the focus voltages FV can be easily estimated with less errors. Even if the estimation is made incorrectly, the AF control can be adjusted by using past information, thereby providing an easier control than a conventional control.

Still further, with such an AF control, it is possible to discriminate between the in-focus and much blurry states even if the contents of the focus voltage difference ΔFV data 302 indicate the pattern (4) shown in FIG. 6, without discrimination errors. Such discrimination therefore requires only a small program, simplifying the overall control.

The third embodiment of the present invention will be described.

The focus voltage FV changes greatly in the course of reaching the in-focus state, but it changes less in the in-focus and much blurry states. Therefore, even if changes of a plurality of past focus voltages FV are checked to know a tendency of changes of focus voltages, it is difficult to correctly and reliably discriminate between the in-focus and much blurry states. The third embodiment aims at solving such problems. While the focus lens group 101 moves toward the focusing point, the focus voltage will continuously increase. However, there is some case where the focus voltage changes to a negative side because of noises on electrical circuits, abrupt change of the subject, or other causes. Similarly, while the focus lens group 101 moves away from the focusing point, the focus voltage will continuously decrease. However, there is some case where the focus voltage changes to a positive side. These phenomena are not desired for the discrimination between the in-focus and much blurry states and for the determination of focusing direction.

Figure 10:
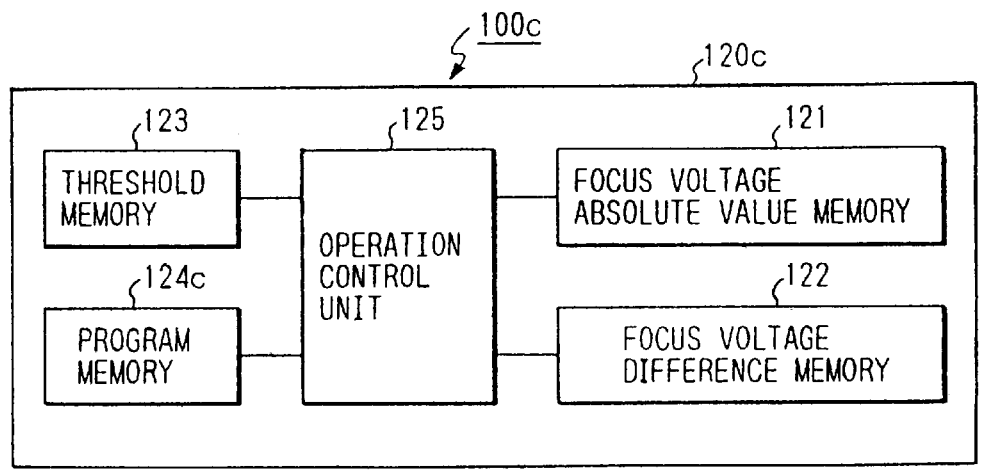
FIG. 10 is a schematic diagram showing the structure of a system controller for a camera according to a third embodiment of the present invention.

FIG. 10 is the outline structure of a system controller 120c of the third embodiment camera 100c according to the present invention. The camera 100c of the third embodiment has the same structure as the camera 100b of the second embodiment shown in FIG. 8, except the system controller 120c. The system controller 120c shown in FIG. 10 has a focus voltage absolute value memory 121, focus voltage difference memory 122 and threshold value memory 123 like those of the second embodiment camera 100b, and a program memory 124c and operation control unit 125c.

The program memory 124c stores the program for executing the AF control by the operation control unit 125c.

As shown in FIG. 11, the operation control unit 125c divides the focus voltage absolute value FV data 301 corresponding to the region 303 near the focusing region shown in FIG. 5 into several blocks. Each block is assigned a single sign which is determined from the sign having a larger number of occurrences, within the block, of positive or negative signs of differences between pairs of two absolute values FV, or from the sign representing an average of positive and negative sign occurrences.

In this embodiment, the positive and negative signs of differences between pairs of adjacent two absolute values $FV_0$ to $FV_{20}$ during vertical synchronizing periods are divided, for example, into four blocks 401 to 404. Each block is assigned a single sign which is determined from the sign having a larger number of occurrences within the block, or from the sign representing an average of positive and negative signs. It is therefore possible to correctly discriminate between the in-focus and out-of-focus states and determining the direction toward the focusing point. In the example shown in FIG. 11, it can be determined from the average of signs that the focus lens group 101 is moving toward the focusing region for the blocks 401 to 403, and from the average of signs that the focus lens group 101 is at the focusing region. By using as the sign of each block the sign having a larger number of occurrences or the sign representing an average of positive and negative signs, it is possible to correctly discriminate between the in-focus and out-of-focus states even if the focus voltages fluctuate because of noises on electrical circuits. Specifically, if the number of positive signs are sufficiently large as in the case of the block 401, this block 401 is assigned a positive sign. If the numbers of positive and negative signs are generally equal as in the case of the block 404, this block 404 is regarded as having the pattern (4) of FIG. 6.

With the third embodiment camera 100c constructed as above, the following advantageous effects can be obtained. Noises or an abrupt change of a subject may cause negative signs within the region 303 of FIG. 5 where the focal length should continuously increase, and conversely may cause positive signs within the region where the focal length should continuously decrease. Such a phenomenon may provide an erroneous judgment of in-focus and much blurry states even if the focus lens group is moving toward the focusing point, resulting in a failure of the AF control. However, according to the third embodiment, even if noises or an abrupt change of a subject occurs during the focusing operation, the AF control will not be adversely affected.

As above, by assigning each block with a representative positive or negative sign, an abrupt increase/decrease of the focus voltage caused by the movement of a subject in or out of the range finding frame, becomes hard to affect the AF control. Furthermore, the influence of noises is considerably reduced so that it becomes easy to distinguish between noises and the movement of a subject in or out of the frame. Therefore, the quality of the AF control can be improved, being less affected by noises and the movement of a subject in or out of the frame.

It is obvious that dividing the focus voltages FV into blocks to obtain a tendency of focus voltage change as in this embodiment is applicable to the first embodiment of FIG. 4 which is not provided with a threshold memory.

Even if the sign having a larger number of occurrences or the sign representing an average is representatively provided as the sign of each block 401 to 404, there is some case where noises on electrical circuits or the like may cause several focus voltage falls, for example, while the focus voltages rise as a whole, resulting in a false judgment. Such a false judgment can be avoided by weighting a focus voltage difference depending upon whether the same signs continue or not. This method will be described below as the fourth embodiment.

FIG. 12 shows the outline structure of a system controller 120d of the fourth embodiment camera 100d according to the present invention. The camera 100d of the fourth embodiment has the same structure as the camera 100c of the third embodiment shown in FIG. 10, except the system controller 120d. The system controller 120d shown in FIG. 12 has a focus voltage absolute value memory 121, focus voltage difference memory 122 and threshold value memory 123 like those of the third embodiment camera 100c, and a program memory 124d, operation control unit 125d and calculation form memory 126.

The calculation form memory 126 stores calculation forms F1 to F4. The calculation form F1 sets $\Delta FV_n$ to $\Delta FV_{n-1}$-weight coefficient K. The calculation form F2 sets $\Delta FV_n$ to -1. The calculation form F3 sets $\Delta FV_n$ to +1. The calculation form F4 sets $\Delta FV_n$ to $\Delta FV_{n-1}$+weight coefficient K.

Figure 13:
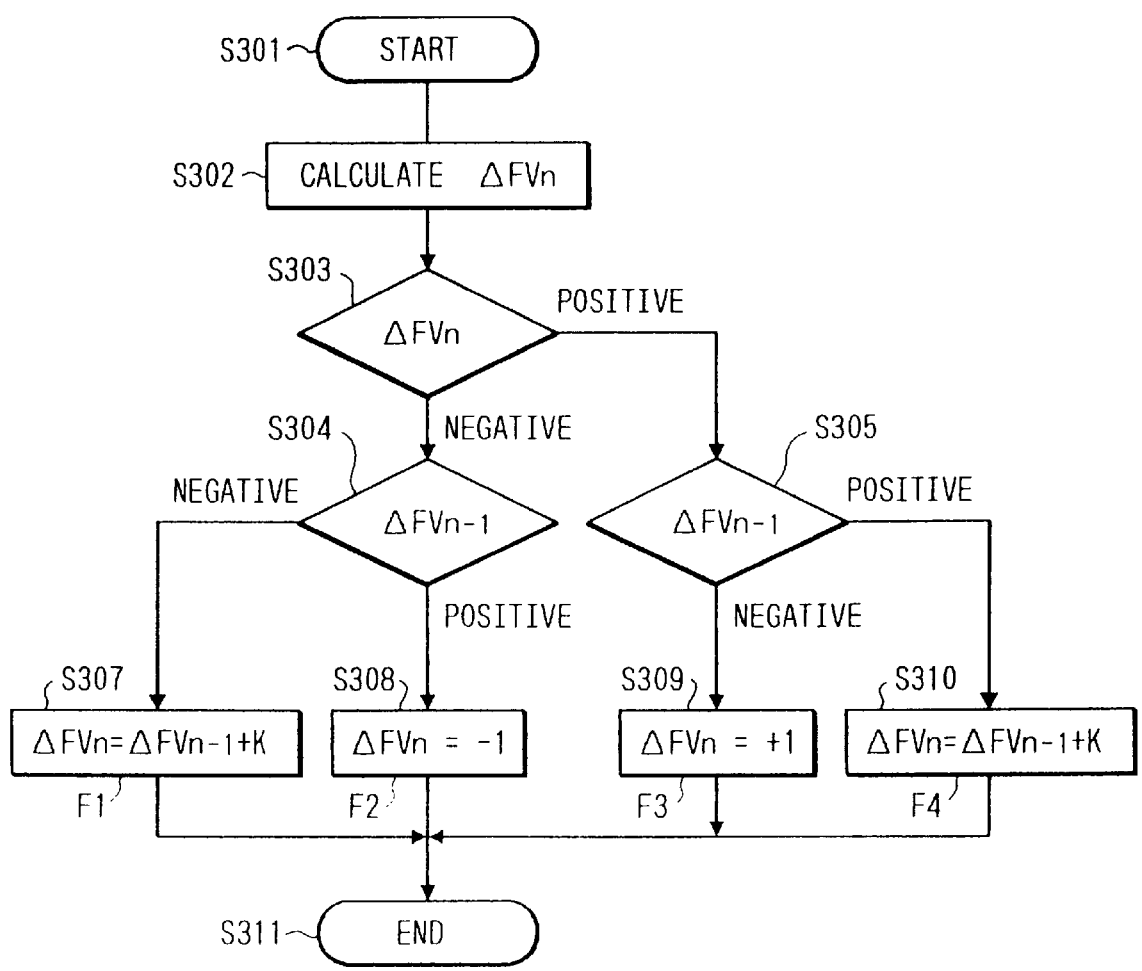
FIG. 13 is a flow chart illustrating the function of the system controller.

The program memory 124 stores a program for executing the contents of the flow chart shown in FIG. 13 and other data.

The operation control unit 125d performs various calculations given in the flow chart of FIG. 13. Namely, the operation control unit 125d performs various calculations (S305 to S307) in accordance with the positive or negative sign of the focus voltage difference $\Delta FV_n$ between the present focus voltage $FV_n$ and the previous focus voltage $FV_{n-1}$, and in accordance with the previous focus voltage difference $\Delta FV_{n-1}$.

The AF control by the system controller 120d of the fourth embodiment camera 100d constructed as above will be described with reference to the flow chart shown in FIG. 13.

When the execution of the program starts (S301), the operation control unit 125d calculates a difference $\Delta FV_n$ between the present absolute value $FV_n$ and the previous absolute value $FV_{n-1}$ (S302). Next, the operation control unit 125d discriminates between the positive and negative of the difference $\Delta FV_n$ (S303) and discriminates between the positive and negative of the difference $\Delta FV_{n-1}$ (S304, S305). In accordance with the positive or negative, the calculation form for the difference $\Delta FV_n$ is selected (S307 to S310).

Specifically, the difference $\Delta FV_n$ is represented by "+1", "0" or "-1" respectively for the positive, zero or negative of the difference $\Delta FV_n$. At next step 303 the positive or negative of the difference $\Delta FV_n$ is judged. If negative, the control advances to step 304, and if positive the control branches to step 305.

If the present difference $\Delta FV_n$ is negative, the positive or negative of the previous difference $\Delta FV_{n-1}$ is judged (S304). If negative, i.e., if two negatives occur consecutively, the present difference $\Delta FV_n$ (="-1") is set to a value of the previous difference $\Delta FV_{n-1}$ (="-1") subtracted by the weight coefficient K. If the previous difference $\Delta FV_{n-1}$ is positive, the present difference $\Delta FV_n$ (="-1") itself is set. Similarly, if the present difference $\Delta FV_n$ is positive, the positive or negative of the previous difference $\Delta FV_{n-1}$ is judged (S305). If negative, the present difference $\Delta FV_n$ (="+1") itself is set. If positive, i.e., if two positives occur consecutively, the present difference $\Delta FV$ (="+1") is set to a value of the previous difference $\Delta FV_{n-1}$ (="+1") added with the weight coefficient K.

In the above manner, if two negatives occur consecutively, the operation control unit 125d reads the calculation form F1 from the calculation form memory 126 and stores the calculation results as the difference $\Delta FV_n$ in the calculation form memory 126 (S307). If the negative first occurs and then the positive occurs, the operation control unit 125d reads the calculation form F2 from the calculation form memory 126 and stores the calculation results as the difference $\Delta FV_n$ in the calculation form memory 126 (S308). If the positive first occurs and then the negative occurs, the operation control unit 125d reads the calculation form F3 from the calculation form memory 126 and stores the calculation results as the difference $\Delta FV_n$ in the calculation form memory 126 (S309). If two positives occur consecutively, the operation control unit 125d reads the calculation form F4 from the calculation form memory 126 and stores the calculation results as the difference $\Delta FV_n$ in the calculation form memory 126 (S310). Thereafter the program execution terminates (S311).

As seen from the flow chart of FIG. 13, if three same signs occur consecutively, the degree of weighting becomes larger.

The difference $\Delta FV_n$ between a pair of absolute values $FV_0$ to $FV_{20}$ is weighted by using the weight coefficient K if two positives or negatives occur consecutively. If three positives or negatives occur consecutively, the difference $\Delta FV_n$ is set to a larger value. Therefore, even if the focus voltage changes greatly because of noises on electrical circuits or the like, discrimination between the in-focus and out-of-focus states can be correctly made. The weighting may be applied to the embodiment shown in FIG. 11 wherein differences between absolute values $FV_0$ to $FV_{20}$ are divided into blocks each being assigned a sign determined from the sign having a large number of occurrences or the sign representing an average of positive and negative signs. In this case, for example, even if several voltage falls occur while the focus voltages FV rise as a whole, the weighting is made preferential and so the voltage fall tendency which otherwise becomes a false judgment cause is neglected.

Figure 14:
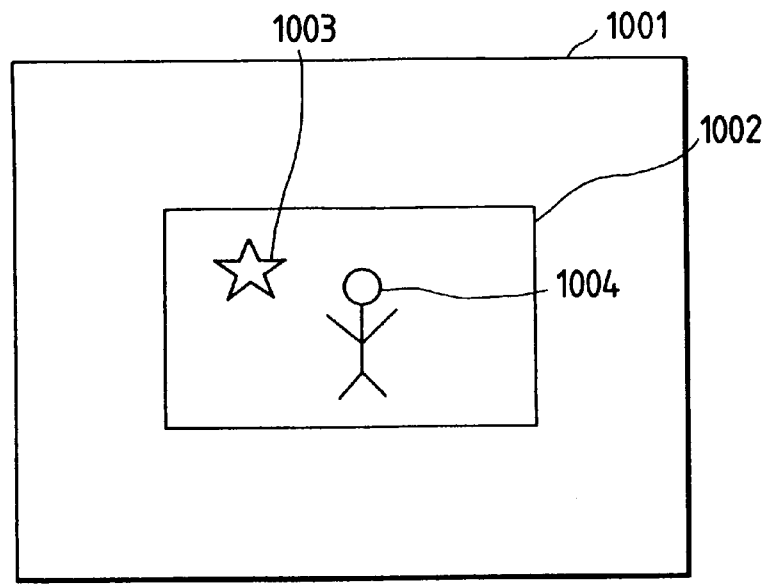
FIG. 14 is a view showing an example of an image to be taken.
Figure 15:
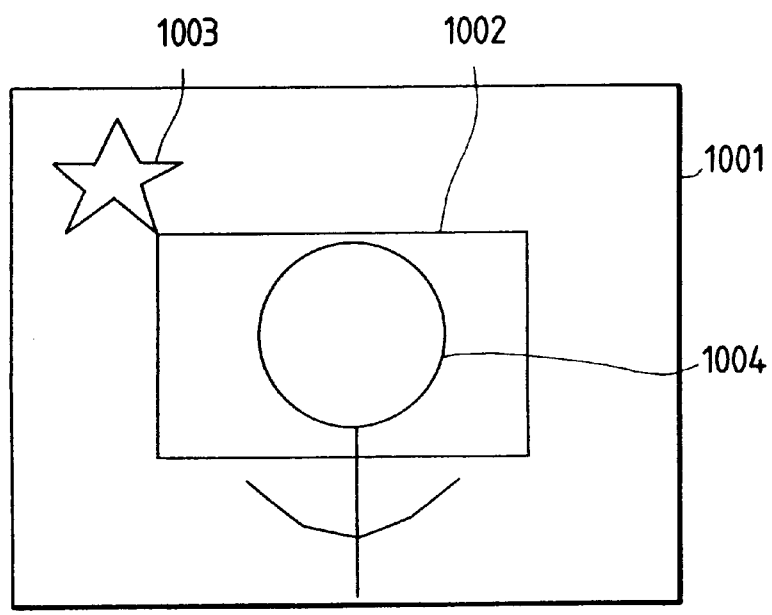
FIG. 15 is a view showing a change in position of the image to be taken.

According to the fourth embodiment camera 100d constructed as above, the signs of differences between focus voltages FV are processed in the above manner. This embodiment may be used with the average calculation and block division as described with the third embodiment shown in FIG. 11. In this case, for example, even if several voltage falls occur while the focus voltages FV rise as a whole, the weighting is made preferential and so the voltage fall tendency which otherwise becomes a false judgment cause is neglected. A steep fall of the focus voltage can also be reliably processed while providing a correct AF control. An example of this steep fall is illustrated in FIGS. 14 and 15. Namely, FIG. 14 shows a wide-photo image wherein a subject 1003 of high brightness and a man 1004 are within the range finding frame 1002 of the image screen 1001, and FIG. 15 shows a telephoto image wherein the man 1004 only is within the range finding frame 1002. With such a variable magnification operation, the focus voltage FV falls steeply as shown in FIG. 7.

Furthermore, although the image having approximately the same number of positive and negative signs as in the case of the blocks 402 and 404 shown in FIG. 11, is likely to be misjudged by the third embodiment as an in-focus state, the fourth embodiment can more correctly discriminate between the in-focus and out-of-focus states, since the weighting is changed depending upon whether consecutive same signs occur or not.

The present invention is not limited to the above embodiments, but various modifications are possible without departing from the scope of the present invention.

As described above, according to the present invention, the position of the focus lens is adjusted in accordance with a history of high frequency component values, from the viewpoint that the high frequency component value becomes maximum at the in-focus position of the focus lens, and becomes smaller as the focus lens moves apart from the focusing point. Therefore, it is possible to provide an automatic focusing camera of high precision in a simple manner.

According to the above embodiments, the position of the focus lens is adjusted in accordance with a history of high frequency component values and a change state of high frequency component value increments/decrements. Therefore, for example, even if an abrupt movement of a subject into or out of the range finding frame occurs or even if the high frequency component values change abnormally because of noises or the like, the change state of high frequency component value increments/decrements becomes abnormal. It is therefore possible to provide an automatic focusing camera of high precision in a simple manner.

It is also possible to reduce a possibility of a failure of discrimination between the in-focus and out-of-focus states and a misjudgment of the direction toward the focusing point. Even if such a failure or misjudgment occurs, the AF control can easily recover the normal state by using past history data. Furthermore, use of the block division of sampled focus voltages, assignment of a sign of each block with the sign having a larger number of occurrences or the sign representing an average, and weighting, can prevent a failure of discrimination between the in-focus and out-of-focus states even if the focus voltage changes due to noises on electrical circuits or the like.

Next, the fifth embodiment of the present invention will be described.

In the above-described embodiments, focusing is performed by driving the focus lens as the front first lens group. However, in recent video cameras, from the reasons of compactness and others, a so-called inner focus type lens system is widely used wherein the focus lens is disposed at the back of the variable magnification lens, and the position of the focus lens is controlled for the focusing thereof and for the adjusting of the shift of the focusing plane caused by the movement of the variable magnification lens.

In the inner focus type lens system, the focus lens is required to perform both the focusing operation and the adjusting operation of the shift of the focusing plane caused by the movement of the variable magnification lens. Therefore, it is necessary to control the movement of the focus lens in a complicated manner basing upon the relative position of the zoom lens and focus lens.

In the fifth embodiment, the present invention is applied to such an inner focus type lens system.

Figure 16:
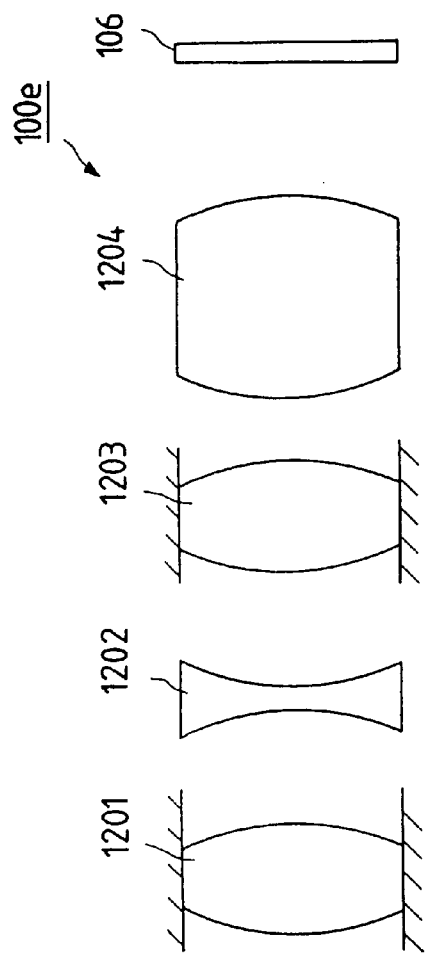
FIG. 16 shows the structure of an inner focus type lens system according to a fifth embodiment of the present invention.

FIG. 16 shows the outline structure of an inner focus type lens system of the fifth embodiment camera 100e according to the present invention. Reference numeral 1201 represents a fixed first lens group, reference numeral 1202 represents a second lens group (V lens) for variable magnification, reference numeral 1203 represents a fixed third lens group, and reference numeral 1204 represents a fourth lens group (C lens) with a function of correcting the shift of the focusing plane caused by the variable magnification and with a function of focusing.

Figure 17:
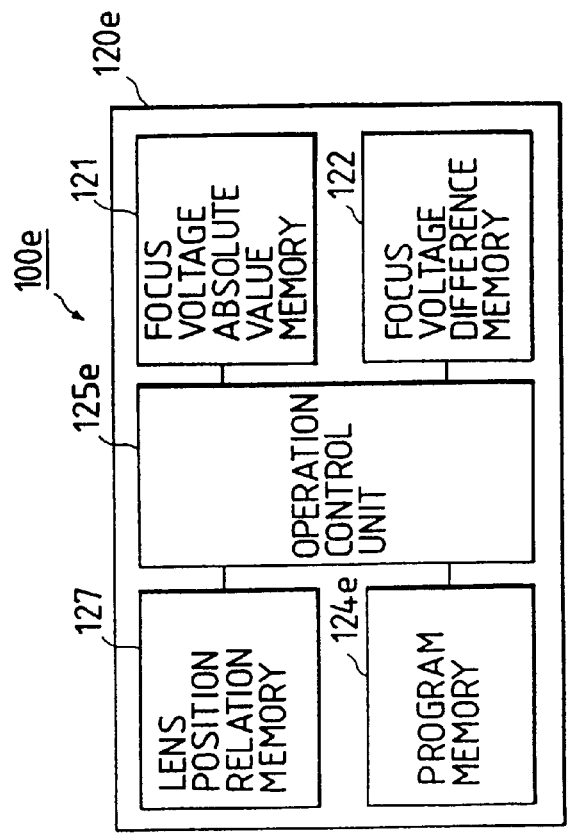
FIG. 17 is a block diagram showing the structure of a system controller for explaining the fifth embodiment of the present invention.

FIG. 17 shows the outline structure of a system controller 120e of the fifth embodiment camera 100e carrying out the AF control of the lens system shown in FIG. 16, according to the present invention. The system controller 120e shown in FIG. 17 has a focus voltage absolute value memory 121, focus voltage difference memory 122 like those of the first embodiment camera 100a, and a program memory 124e, operation control unit 125e and lens position relation memory 127.

Figure 19:
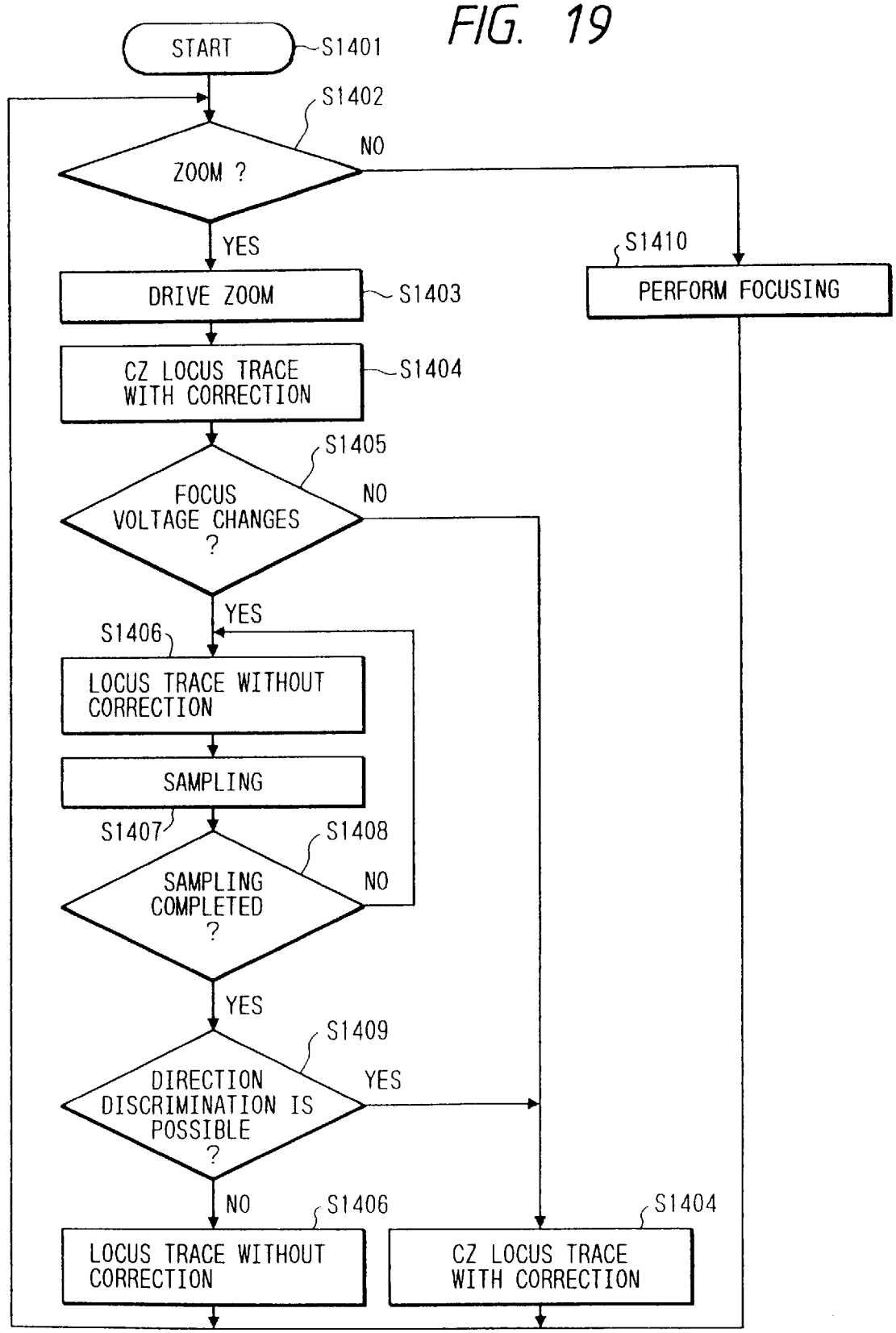
FIG. 19 is a flow chart for explaining the operation of the fifth embodiment of the present invention.

In the program memory 124e, programs for execution of processings of the flow chart shown in FIG. 19 are stored.

The operation control unit 125e executes the ordinary AF control as well as the movement control of the V lens 1202 and C lens 1204, and the program shown in the flow chart of FIG. 19.

Figure 18:
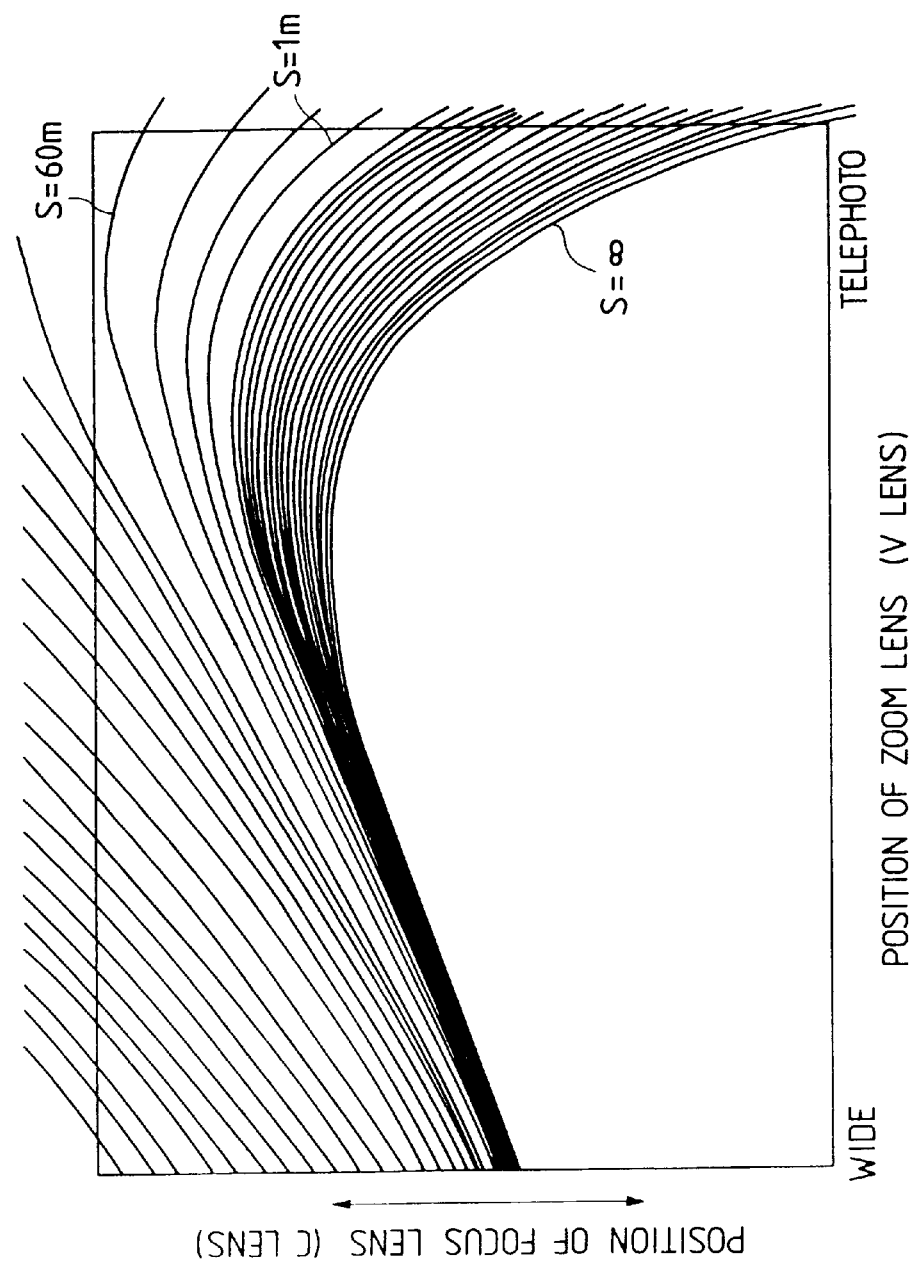
FIG. 18 is a graph showing the characteristics of an inner focus type lens system.

The lens position relation memory 127 stores the position relation shown in FIG. 18 between the positions of the V lens 1202 and C lens 1204. In the inner focus type lens system such as shown in FIG. 16, the focusing position is determined from the positions of the V lens 1202 and C lens 1204 as the function of a subject distance. The abscissa of FIG. 16 is the position of the V lens 1202 and the ordinate is the position of the C lens 1204, a subject distance being used as a parameter. As seen from FIG. 18, if the V lens 1201 is moved for the zooming purpose, the blur amount of the image changes and the focus voltage changes, even if the C lens 1204 is held at a fixed position.

The AF control by the system controller 120e of the fifth embodiment camera 100e constructed as above will be described with reference to the flow chart of FIG. 19, while considering the case of an abrupt change of the focus voltage to be caused by the movement of a subject into or out of the range finding frame.

When the execution of the program starts (S1401), the operation control unit 125e checks whether the zoom switch is being depressed (S1402). If not (No judgment), the operation control unit 125e executes the ordinary AF control like that described previously. If depressed (Yes judgment), the operation control unit 125e moves the V lens 1202 (S1403). At the same time, a locus trace with correction is performed. Specifically, while detecting one of traces shown in FIG. 18 which gives the least blur, the C lens 1204 is moved (S1404). It is checked whether the focus voltage changes abruptly during the zooming (S1405). If the focus voltage changes abruptly because of the movement of a subject into or out of the range finding frame (Yes judgment), the operation control unit 125e executes step S1406 and succeeding steps. If there is no abrupt change of the focus voltage (No judgment), the locus trace with correction continues (S1404) and the C lens 1204 is moved correspondingly.

At step S1406, in order to avoid an unnecessary movement of the C lens 1204, the locus on which the lenses 1202 and 1204 ride at that time is temporarily traced while continuing the zooming operation. After the focus voltage abruptly changes during the zooming because of the movement of a subject into or out of the range finding frame, the amount of blur changes in the case of the inner focus type lens. This change state is monitored by sampling the focus voltage as described with FIG. 5 (S1407). It is checked whether the sampling has been repeated necessary times (S1408). If it has been repeated necessary times (Yes judgment), it is checked whether the direction toward the focusing point can be identified (S1409). Whether the direction can be identified means that whether the focus voltage data indicates the state of its increase/decrease as described previously. If the judgment at step S1409 is considered identifiable (Yes judgment), the direction toward the blur focusing point is corrected in accordance with the sampled contents. If not, the trace without correction continues (S1406) or another correction scheme (not illustrated) is performed.

According to the fifth embodiment camera 100e constructed as above, even if the focus voltage changes abruptly, a conventional misjudgment that the focus lens has passed the focusing point can be eliminated and a new subject can be traced during the zooming operation, preventing an unnecessary movement of the C lens 1204 and an interception of the position correction.

Furthermore, it is obvious that this embodiment may used the scheme for processing the values of focus voltages not discretely but collectively for each block as described with FIG. 11, and the scheme for selectively using the calculation forms described with FIGS. 12 and 13.

According to this embodiment, even an inner focus type lens heretofore having required complicated control can be controlled reliably and stably with respect to its focusing.

What is claimed is:

1. A camera device comprising:

lens moving means for moving a focus lens;

photoelectric converting means for converting an image having passed through said focus lens, into an image signal;

sampling means for sampling a focus signal component value of said image signal;

storing means for storing a set of a plurality of differences between respective focus signal component values time-serially sampled by said sampling means; and controlling means for controlling a focus state of said focus lens by predicting a change of the focus state from a variation pattern of said plurality of differences of the set stored in said storing means to control said lens moving means so as to maximize the focus signal component value.

2. A camera device according to claim 1, wherein focus signal component valve is a high frequency component value and said controlling means discriminates between in-focus and out-of-focus states and determining a direction of driving said focus lens, in accordance with a plurality of high frequency component values sampled by said sampling means.

3. A camera device according to claim 2, wherein said sampling means includes a high-pass filter and samples synchronously with Vertical Sync.

4. A camera device according to claim 2, wherein said storing means stores a predetermined number of data of the high frequency values sampled by said sampling means, and stores differences between adjacent pairs of said predetermined number of data.

5. A camera device according to claim 4, wherein said controlling means controls to drive said lens moving means in accordance with said differences between the adjacent pairs of said predetermined number of data.

6. A camera device comprising:

lens moving means for moving a focus lens;

photoelectric converting means for converting an optical image having passed through said focus lens, into an image signal;

sampling means for sampling a high frequency component value of said image signal;

storing means for storing a set of a plurality of the high frequency component values sampled by said sampling means during a predetermined period; and controlling means for controlling a focus state of said focus lens by detecting change of the focus state caused by the movement of said focus lens, according to a plurality of differences between the respective high frequency component values of the set stored in said storing means, said controlling means controls the focus state by predicting the focus state in accordance with whether an absolute value of said high frequency component value is larger than a predetermined value in the case that the detected continuous change of the focus state is small.

7. A camera according to claim 6, wherein said storing means stores an absolute value of each of a plurality of consecutive high frequency component values sampled by said sampling means and differences between adjacent pairs of the sampled high frequency component values.

8. A camera device according to claim 7, wherein said controlling means includes a microcomputer comprising a memory for storing said absolute value of the high frequency component values, a memory for storing said differences between adjacent pairs of the sampled high frequency component values, a memory for storing said predetermined value, and an operation control unit for calculating focus control data from information stored in said memories.

9. A camera device according to claim 6, wherein said controlling means divides the plurality of high frequency component values sampled by said sampling means into a plurality of blocks, and performs a focus control in accordance with the continuous change of the focusing state obtained by statistically processing said change state for each block.

10. A camera device according to claim 9, wherein said statistical process is one of an averaging process and a majority deciding process.

11. A camera device comprising:

lens moving means for moving a focus lens;

photoelectric converting means for converting an optical image having passed through said focus lens, into an image signal;

sampling means for sampling a focus detection signal from the image signal;

storing means for storing a set of a plurality of differences between the respective focus detection signals time-serially sampled by said sampling means;

change state detecting means for detecting change of the plurality of differences of the set stored in said storing means; and controlling means for controlling a focus state of said focus lens by a first control method in accordance with the continuous change detected by said change state detecting means so as to a maximize a level of the focus detection signal in the case that the continuous change is stable, and by a second control method different from said first control method, for predicting the focus state on the basis of the set of differences stored in storing means in the case that the change state is not stable.

12. A camera device according to claim 11, wherein said controlling means temporarily stops a focus control operation when a change of a plurality of focus detection signals stored in said storing means exceeds a predetermined value.

13. A camera device according to claim 11, further comprising a variable magnification lens and a lens position memory for storing a position relation between said variable magnification lens and said focus lens.

14. A camera device according to claim 13, wherein said first control method controls driving of said focus lens in accordance with the position relation data stored in said lens position memory while providing a minimum blur correction, and said second method controls the driving of said focus lens in accordance with the position relation data stored in said lens position memory without providing a blur correction.

15. A camera device according to claim 13, wherein said controlling means changes a degree of weighting for a focus control data calculation, in accordance with said change state of a plurality of focus detection signals stored in said storing means.

16. A camera device according to claim 13, wherein said focus detection signal is a high frequency component of said image signal.

17. A camera device according to claim 13, wherein said controlling means divides a plurality of focus detection signals stored in said storing means into a plurality of blocks, statistically obtains a change of the focus detection signals in each block, and performs a focus control operation in accordance with said obtained change.

18. A camera device according to claim 17, wherein said controlling means changes a degree of weighting if said change state of said focus detection signals increase or decrease consecutively in the same direction.

19. An automatic focus control device comprising:

lens moving means for moving a focus lens;

photoelectric converting means for converting an optical image having passed through said focus lens, into an image signal;

extracting means for extracting a focus signal from said image signal;

storing means for storing a set of a plurality of differences between respective focus signals time-serially extracted by said extracting means; and controlling means for controlling a focus state of said focus lens in accordance with a variation pattern of said plurality of differences of the set stored in said storing means to control said lens moving means so as to maximize a level of focus signal on the basis of the controlled focus state.

20. A device according to claim 19, wherein said focus signal is a high frequency component value of said image signal and said controlling means discriminates between in-focus and out-of-focus states and determining a direction of driving said focus lens, in accordance with a plurality of high frequency component values extracted by said extracting means.

21. A device according to claim 20, wherein said extracting means includes a high-pass filter and samples synchronously with vertical Sync.

22. A device according to claim 20, wherein said storing means stores a predetermined number of data of the high frequency values extracted by said extracting means, and stores differences between adjacent pairs of said predetermined number of data.

23. A device according to claim 22, wherein said controlling means controls to drive said lens moving means in accordance with said differences between the adjacent pairs of said predetermined number of data.

* * * * *

UNITED STATES PATENT AND TRADEMARK OFFICE
CERTIFICATE OF CORRECTION

PATENT NO. : 6,130,716  
DATED : October 10, 2000  
INVENTOR(S) : Hirasawa

Page 1 of 1

It is certified that error appears in the above-identified patent and that said Letters Patent is hereby corrected as shown below:

Title page,  
Please insert

[*] Notice: This patent issued on a continued prosecution application filed under 37 CFR 1.53 (d), and is subject to the twenty year patent term provisions of 35 U.S.C. 1.54 (a) (2).

Signed and Sealed this

Third Day of July, 2001

Attest:

*Attesting Officer*

NICHOLAS P. GODICI  
*Acting Director of the United States Patent and Trademark Office*

UNITED STATES PATENT AND TRADEMARK OFFICE
CERTIFICATE OF CORRECTION

PATENT NO. : 6,130,716
DATED : October 10, 2000
INVENTOR(S) : Masahide Hirasawa

It is certified that error appears in the above-identified patent and that said Letters Patent is hereby corrected as shown below:

Column 7,
Line 64, delete "$FV_O$" and insert -- $V_O$ --.

Column 9,
Line 12, delete "$FV_O$" and insert -- $V_O$ --.

Column 11,
Line 55, delete "$\Delta FV$" and insert -- $\Delta FV_n$ --.

Signed and Sealed this

Thirteenth Day of November, 2001

Attest:

NICHOLAS P. GODICI
Attesting Officer   Acting Director of the United States Patent and Trademark Office